(12) United States Patent
Dennis et al.

(10) Patent No.: US 6,488,103 B1
(45) Date of Patent: Dec. 3, 2002

(54) DRILLING TOOL AND METHOD OF USING SAME

(75) Inventors: Mahlon D. Dennis, Kingwood, TX (US); Thomas M. Dennis, Kingwood, TX (US); Eric M. Twardowski, Spring, TX (US)

(73) Assignee: Gas Research Institute, Des Plaines, IL (US)

( * ) Notice: Subject to any disclaimer, the term of this patent is extended or adjusted under 35 U.S.C. 154(b) by 2 days.

(21) Appl. No.: 09/754,807

(22) Filed: Jan. 3, 2001

(51) Int. Cl.$^7$ .............................................. E21B 10/26
(52) U.S. Cl. .................... 175/19; 175/106; 175/334; 175/385
(58) Field of Search ............................... 175/334, 335, 175/106, 385, 391, 325.3, 373, 371, 19

(56) References Cited

U.S. PATENT DOCUMENTS

| 3,322,466 | A |   | 5/1967  | Mennekes |       |
|-----------|---|---|---------|----------|-------|
| 3,335,806 | A |   | 8/1967  | Caro     |       |
| 3,441,096 | A |   | 4/1969  | Lautsch  |       |
| 3,491,843 | A |   | 1/1970  | Rodriguez|       |
| 3,517,759 | A |   | 6/1970  | Crumbo   |       |
| 3,669,199 | A |   | 6/1972  | Cullen et al. | |
| 3,964,555 | A |   | 6/1976  | Franklin |       |
| 4,004,642 | A |   | 1/1977  | Dardick  |       |
| 4,678,045 | A | * | 7/1987  | Lyons    | 175/61 |
| 4,683,964 | A |   | 8/1987  | Wenzel   |       |
| 4,744,426 | A |   | 5/1988  | Reed     |       |
| 5,343,964 | A |   | 9/1994  | Leroy    |       |
| 5,472,057 | A |   | 12/1995 | Winfree  |       |
| 5,833,018 | A | * | 11/1998 | von Gynz-Rekowski | 175/325.3 |
| 5,845,721 | A |   | 12/1998 | Southard |       |
| 6,230,826 | B1| * | 5/2001  | Molly    | 175/351 |

FOREIGN PATENT DOCUMENTS

DE          3927625 A1  *  2/1991

* cited by examiner

*Primary Examiner*—William Neuder
*Assistant Examiner*—Zakiya Walker
(74) *Attorney, Agent, or Firm*—Mark E. Fejer

(57) ABSTRACT

A drilling tool having a pilot bit on an end of a main shaft is surrounded by outer shafts having mills on their ends. The bit and mills employ cutters with PDC. The pilot bit rotates in a direction opposite the direction of rotation of the mills. A transmission for rotating a main shaft, on which the pilot bit is mounted, and several secondary shafts, on which the mills are respectively mounted, is carried within a housing using diamond thrust and radial bearings. Power is applied to the main shaft and transmitted to the secondary shafts through diamond hardened gears. Drilling fluid is used to cool and lubricate the bearings and gears.

14 Claims, 8 Drawing Sheets

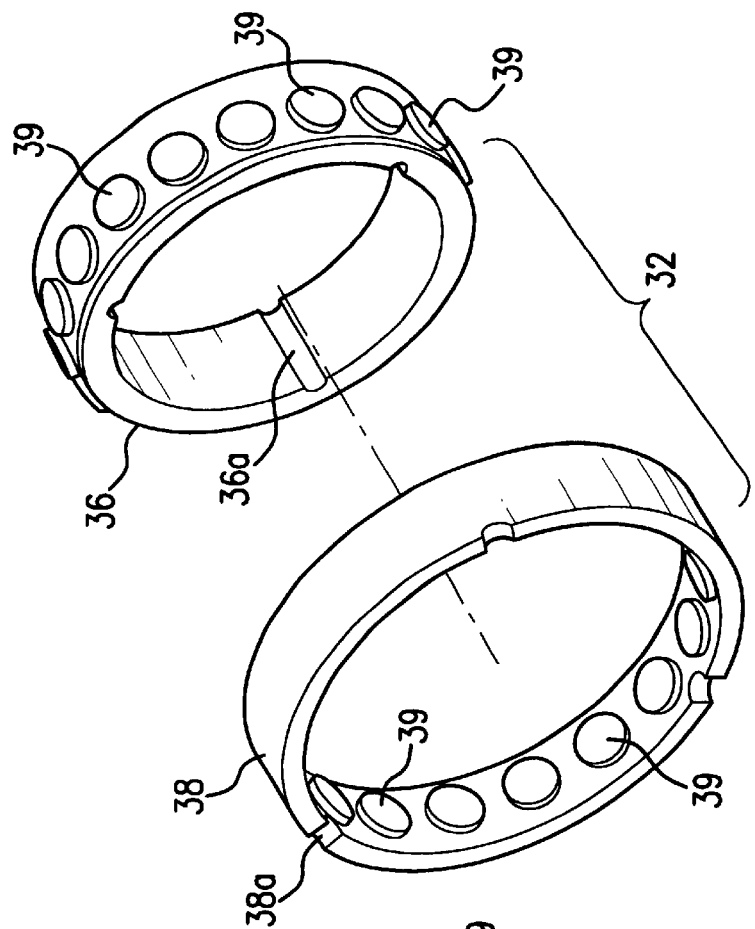
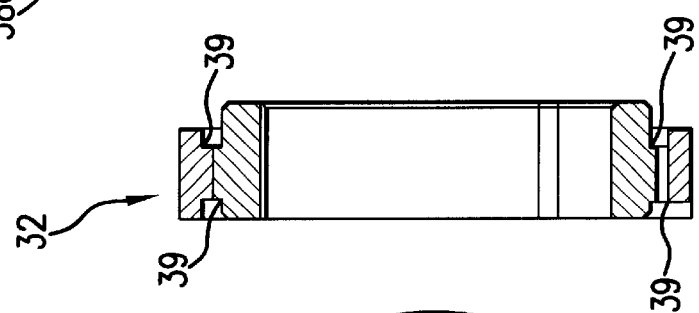
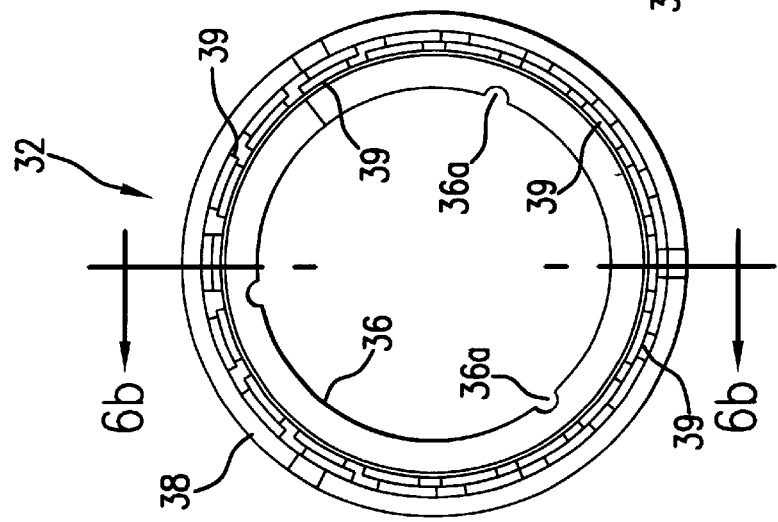

DRILLING TOOL AND METHOD OF USING SAME

BACKGROUND OF THE INVENTION

The invention relates generally to a tool for forming bores in relatively hard materials, and in particular to a rotary drill bit for use in oil, gas, and mining exploration that can maintain low impact and cool operating conditions which facilitates the drilling of harder and more abrasive formations.

Oil and gas field drilling and mining in general employ drills bits having hard and durable cutting contact surfaces. One such cutting and wear insert material used is polycrystalline diamond compact (PDC). PDC is an extremely hard and wear resistant material.

PDC cutters are known to have the lowest rates of wear when used in cooler operating conditions. Wear rates are low when the operational temperatures are maintained below about 700 degrees Celsius. At about 700 degrees Celsius, thermal damage to the diamond layer begins, resulting in loss of wear resistance. Above the critical temperature, the rate of wear of the cutter can be as much as fifty times greater than its rate at cooler conditions.

In conventional PDC drag bits, the velocity of a cutter on a drill bit, when measured relative to the material being cut, depends on its distance from the center of rotation of the drill bit. The further away the cutter is from the axis of rotation of the bit, the greater the velocity of the cutter. Thus, increasing the diameter of a drill bit results in greater velocity for the outside cutters. With greater velocity, there is greater friction, and thus greater heat generated during drilling. At some point, the heat will be sufficient to cause wear rates to accelerate, thus reducing the life of the outside cutters. Heating is particularly a concern for PDC cutters, as PDC tends to break down at elevated temperatures, resulting in a loss of wear resistance and increased breakage due to impact.

Furthermore, when more force is applied, more heat is generated. As harder rock requires more force for cutter penetration, wear rates will naturally be higher in such formations. The critical point at which the wear rate begins to accelerate is a function of rock hardness and bit rotational speed. In softer rocks, accelerated wear rates do not occur until higher rotational speeds are used. Whereas in harder rocks, acceleration of the wear rate occurs at much lower rotational speeds.

Another cause of wear to PDC cutters is breakage from impact. When drilling with conventional PDC drag bits, weight and torque are applied to a drill string. PDC cutters are driven into the formation by applied weight. Torque rotates the bit, dragging its PDC cutters through the formation. Dragging generates chips that are removed, thereby forming the hole. This drilling action causes a reverse, corresponding torque to the drill string. Because of the length of the drill string, the torque tends to wind it like a torsion spring. When conditions are not stable, this tends not to be a problem. But should the bit release from the formation, the drill string will unwind and rotate backward. The resulting load on the drill bit, when it hits against the formation can cause impact damage to the cutters. Furthermore, under typical drilling conditions, a drill string is rotated at 90 to 150 rpm. At these higher speeds, drill strings can tend to vibrate, sometimes severely. Vibration can damage a drill bit, including the cutters, as well as the drill pipe, MWD equipment, and other components in the drilling system.

Contributing to impact loads on PDC cutters is a phenomenon known as "bit whirl." This complex motion of the drill bit is thought to be the result of a combination of causes, such as lateral forces from drill string vibration, heterogeneous rock formations, bit design, and other factors in combination with a radial cutting ability of PDC bits. When a drill bit begins to whirl, PDC cutters on the bit are subjected to large impact loads as the bit bounces against the rock. The cutters can lose large chips of PDC from impact rather than from gradual abrasion of the cutter, which thereby shortens bit life.

PDC cutters thus maintain the longest useful life when used under low impact and cool operating conditions, and in these conditions, they are able to cut extremely hard and abrasive materials with long life. Thus, the usefulness of such drill bits in hard formations tends to limited to low rotational speeds, and thus relatively slow rates of penetration in typical oil well drilling.

SUMMARY OF THE INVENTION

The invention is directed generally to an improved drilling tool and method for drilling. The invention, as defined by the appended claims, has various aspects and advantages that are described below with reference to an example of a drilling tool that embodies the invention.

This exemplary drilling tool includes several features that singularly and collectively can be used to reduce the adverse thermal and/or impact effects on cutters, extending the life of the cutters without affecting drilling performance, and thus also better enabling PDC cutters to be used in hard rock formations and other situations in which they typically have not been used due to such effects. Briefly, this exemplary drilling tool reduces the surface speed of outer cutters, thus reducing thermal stress on the cutters without reducing drilling effectiveness. Furthermore, the drillstring may be rotated at lower rotational speeds, producing less reactive torque, and keeping the drilling tool on a straighter path, thereby tending to reduce vibration, torque on the drill string and "whirl". To reduce complexity and improve reliability, the exemplary drilling tool utilizes abrasion-resistant bearing and gear surfaces, capable of carrying relatively large loads, thus avoiding the need for sealed bearings and gears and permitting use of drilling fluid for cooling and lubrication.

This exemplary drilling tool is illustrated in the accompanying drawings, in which:

BRIEF DESCRIPTION OF THE DRAWINGS

FIG. 6 is an exploded view of a PDC radial bearing assembly for a drilling tool.

DETAILED DESCRIPTION

In the following description, like numbers throughout the figures refer to like elements.

Figure 1:
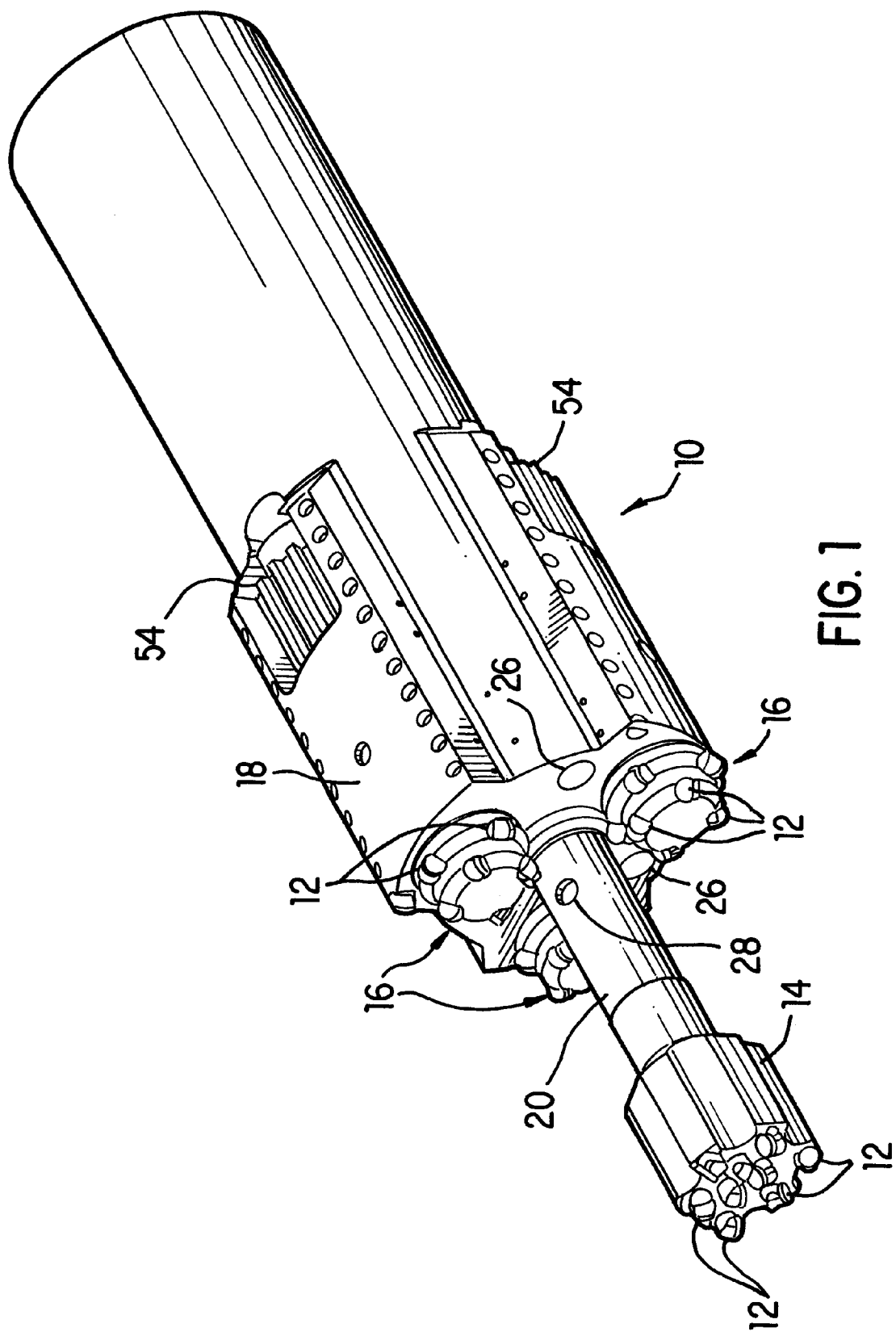
FIG. 1 is a perspective view of a drilling tool having PDC cutters on a pilot bit and outer mills in accordance with the present invention.
Figure 2:
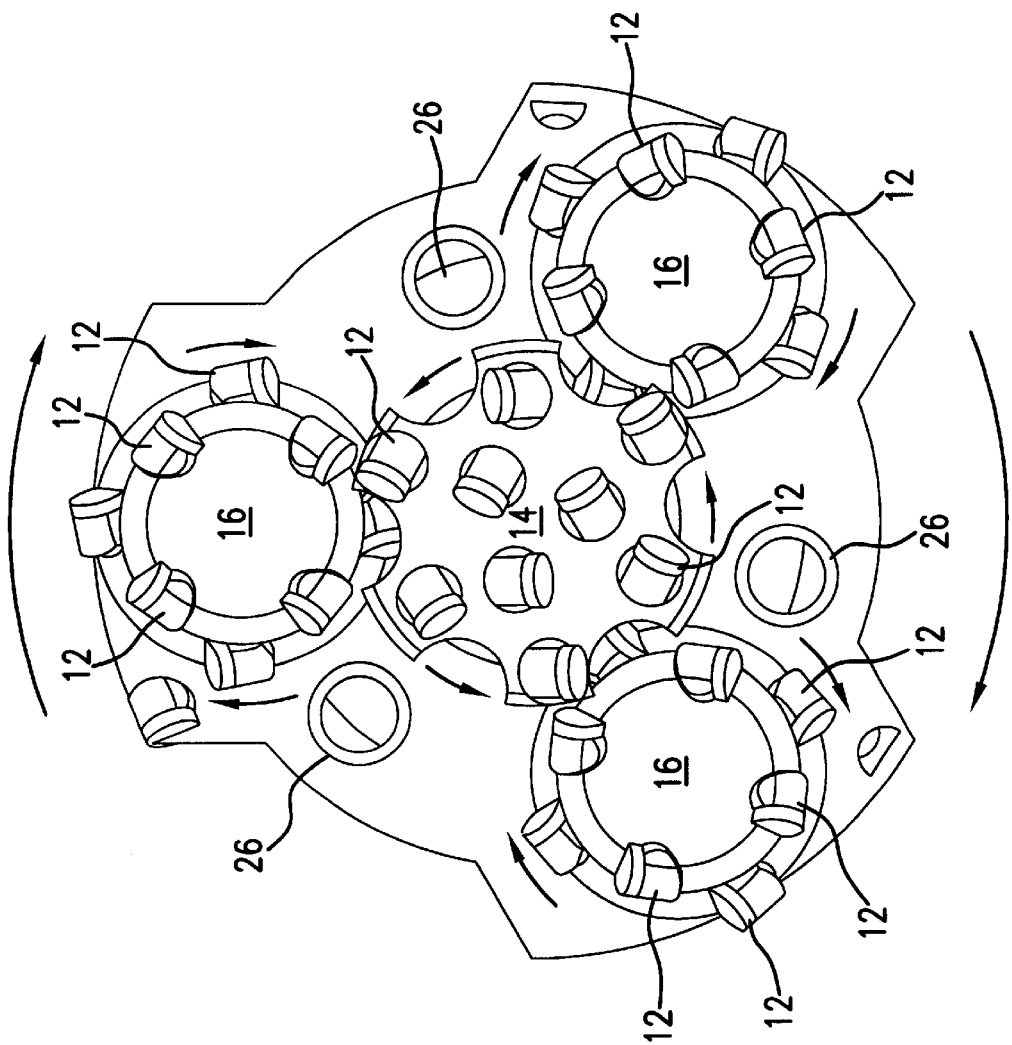
FIG. 2 is a front view of the PDC pilot bit and outer mills showing the cutting elements.

Referring to FIG. 1, an exemplary embodiment of a drilling tool 10 includes a pilot bit 14 and a plurality of mills 16 disposed around the pilot bit. The pilot bit and the mills each revolve. The pilot bit and the mills each carry a plurality of cutters 12. In the illustrated example, the cutters have wear resistant surfaces made of a diamond material, such as PDC. However, tungsten carbide, natural diamond, synthetic grit diamond, or other abrasion resistant cutter materials could be used. The invention is particularly advantageous to the use of PDC cutters. The diamond material is attached to a strong stud, such as one made from tungsten carbide. The mills 16 are arrayed around the pilot bit. The axes of the mills are spaced evenly apart on a fixed radius measured from the axis of the pilot bit for balance. Three such mills are illustrated, but as few as one or more may be employed.

The outer mills rotate in a direction opposite of the pilot bit. The torque of the oppositely turning mills 16 counteracts torque from the pilot bit 10, resulting in a net reduction of reactive torque on the tool while it is drilling. The tool retains the mills using a system that locks to prevent the mills from being accidentally backed-off the tool. Less reactive torque creates fewer problems with orienting the face of the tool, and thus tends to less "wrapping" of the drill string to which the tool is mounted during drilling due to fewer occurrences in which the tool "hangs and releases" on a formation.

Due to the small diameter of the mills, cutters 12 located toward the outer diameter of mills 16, and at on the outermost diameter of the bore being drilled, will have lower tangential velocities for a given rotational velocity as compared to the cutters on a single bit of same diameter as tool 10. Thus, greater rotational speeds and lower wear rates are possible. In the exemplary embodiment, outer cutters 12 on mills 16 rotating at 1310 rpm would be moving at about 700 ft/min. This example results in about a 60% reduction in cutting speed for conventional PDC cutters on a drill bit. However, the greater rotational velocity improves penetration speed. Further, this speed is in the range of bits on mud motors and top drive units. In the exemplary embodiment, the mills have a smaller diameter than the pilot bit. Because of their smaller diameters, the mills may be geared to rotate faster than the pilot drill without adverse effect.

By overlapping the cutting path of each of the mills 16 with the path of the pilot bit 14—i.e. by locating the axis of rotation of each of the mills at a distance from the center axis of the tool less than the sum of the radii of one of the mills and the drill bit—cutters on the mills exit the formation on each revolution to be immersed in drilling fluid. The drilling fluid cools the cutters. To further enhance cooling and provide cleaning action, nozzles 26 spray drilling fluid directly onto the cutters. To permit the cutting paths to overlap, the pilot bit is located forward of the mills, and the shaft 20 to which is mounted is narrower than the pilot bit. The forward location of the bit also tends to reduce "bit whirl". Bit whirl is a side-to-side motion of the tool that causes high impact stress on the cutters. It tends to be caused by tools that have too much side cutting ability—PCD cutters tend to have such ability—which leads to drilling a slightly oversized hole, which in turn allows more side movement and more side cutting. With a pilot bit located forward of the housing, the tool has two stabilizing regions, namely the pilot bit and the housing, that tend to reduce tilting of the bit in the drill hole.

Housing 18 encases the transmission that supplies rotational power to the pilot bit and the mills. The transmission includes a main drive shaft that extends through the housing, on which pilot bit 14 is mounted. The main drive shaft 20 rotates about an axis coincident with the tool's central axis of rotation. The shaft is driven by a motor (not shown). The motor may be, for example, a turbine or a mud motor. An electric motor could also be used.

Referring now to FIGS. 3–5 and 8, the tool's transmission includes the main drive shaft 20, to which pilot bit 14 is mounted, and a plurality of secondary shafts 22, one for each of the mills 16. Power from a motor, such as a turbine motor 33 or other source of rotational power is transmitted to the main drive shaft 20 through coupling 24. A portion of this rotational power from the main drive shaft is transmitted to each of the secondary drive shafts 22 through a set of gears. In the exemplary embodiment, the set of gears includes a main gear 52 that is mounted on the main drive shaft 20, and a pinion gear 54 that is mounted on each of the plurality of secondary shafts. Each pinion gear meshes with the main gear. The diameter of the main gear is greater than the diameter of each of the pinion gears, thereby resulting in a greater rotational velocity of secondary drive shafts.

In the illustrated example, the drilling tool does not require a sealed gear box, thereby providing more room to make the gears larger and avoiding complexity. The gears are made from a hard, abrasion-resistant, relatively low friction material, thereby avoiding the need for a lubricant such as grease. Drilling fluid is used for cooling and lubrication. Use of drilling fluid requires an abrasion-resistant material. For example, the gears may be fitted with tungsten carbide teeth. A diamond material, such as PDC, may also be used on the wear and load surfaces of the gears, thereby increasing the gears ability to withstand higher loads and speeds.

Figure 3:
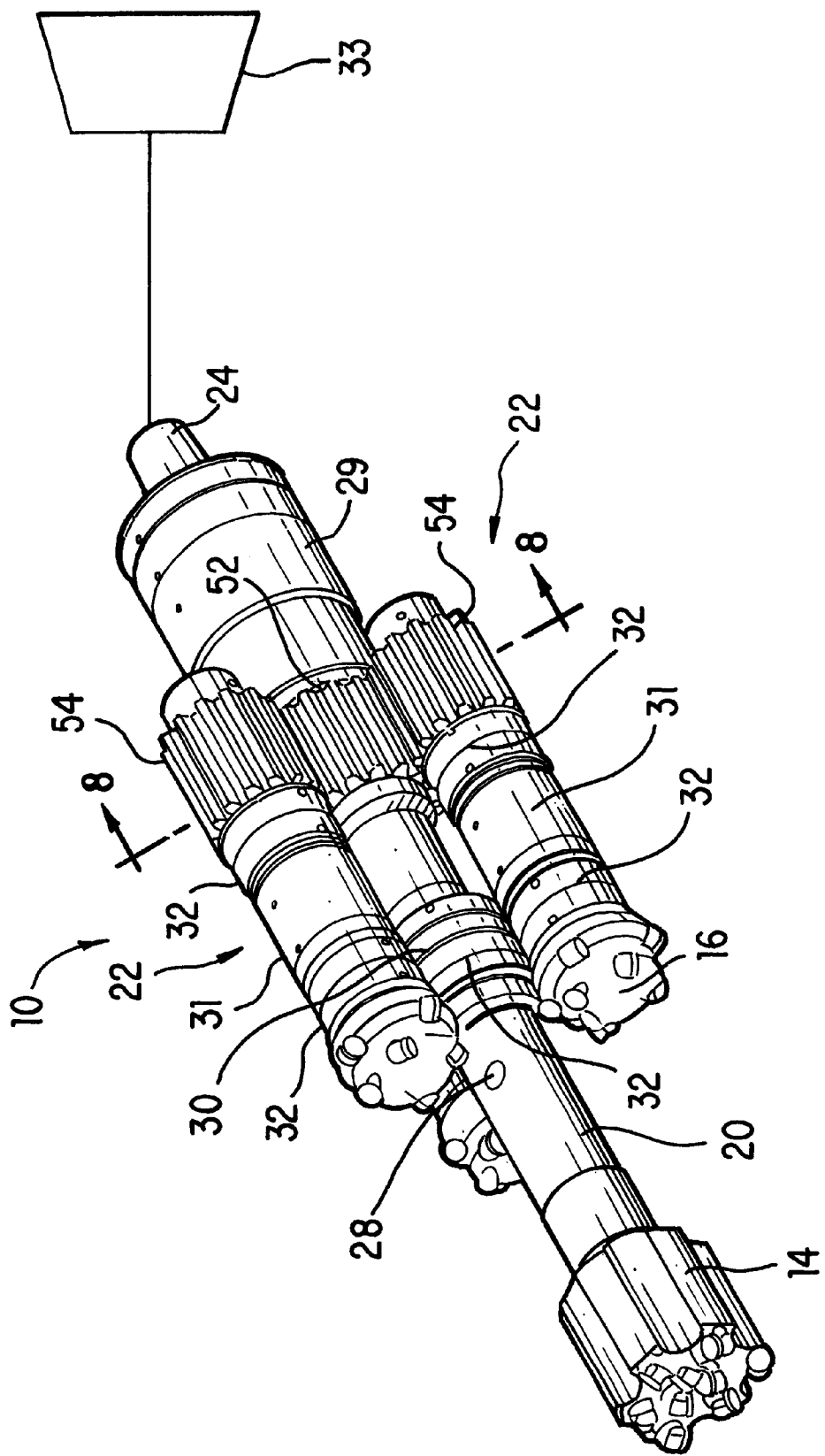
FIG. 3. is a perspective view of the drilling tool in FIG. 1 without a housing.
Figure 4:
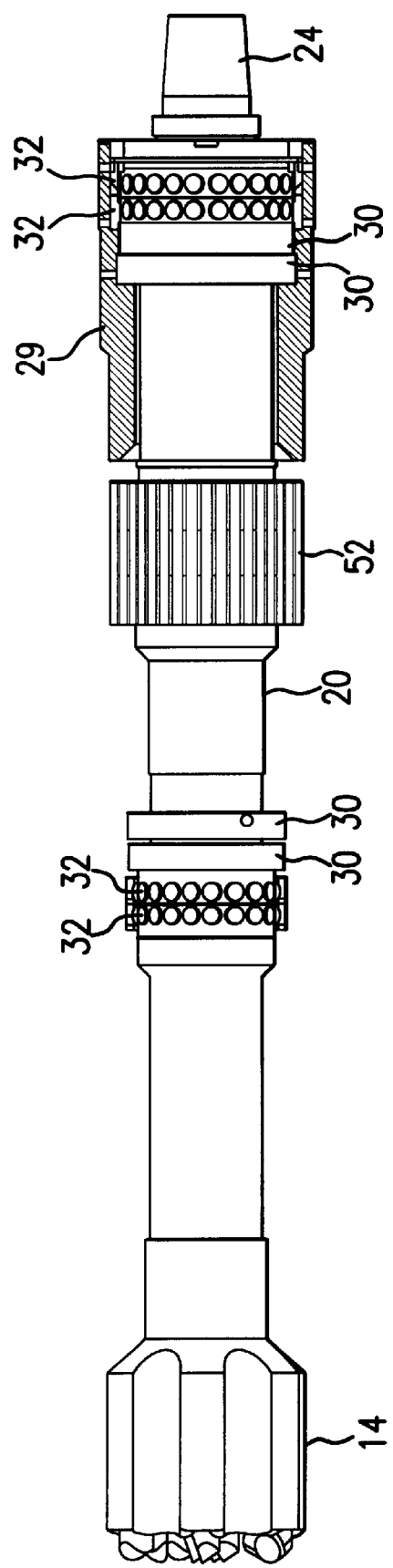
FIG. 4. is a perspective view of a main shaft assembly of the drilling tool in FIG. 1.
Figure 5:
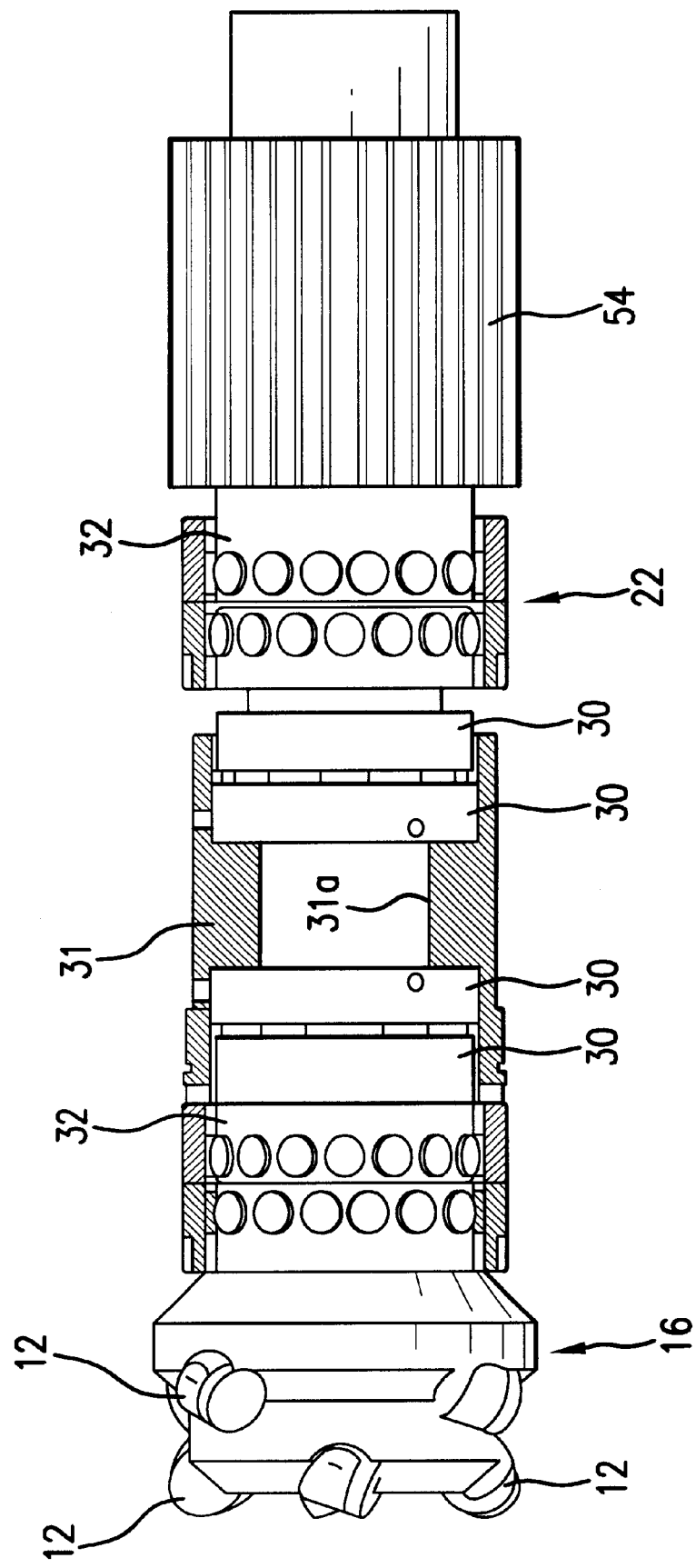
FIG. 5 is a perspective view of a outer bit shaft assembly of the drilling tool in FIG. 1.

Referring to FIGS. 3–5, the main drive shaft 20 and each of the secondary drive shafts 22 are supported within the housing 18 (not shown in these views) of the drilling tool 10 by radial and thrust bearings. The main drive shaft 20 is supported at its upper end by bearings held within an upper bearing carrier 29. This carrier is, in turn, in an opening in the housing through which the shaft extends. As seen in FIG. 4, the carrier holds a thrust bearing 30 and a set of radial bearings 32. A lower portion of the main drive shaft is also supported by a second thrust bearing 30 and a second set of radial bearings 32. Each of the second drive shafts 22 is also supported by first and second thrust bearings 30 and first and second sets of radial bearings 32. As seen in FIG. 5, the two thrust bearings 30 are supported with carrier 31 and rest on opposite sides of a shoulder 31a. The carrier 31 is, in turn, retained in an opening in the housing through which the shaft extends.

Referring now to FIGS. 6a, 6b, and 6c, each radial bearing 32 is comprised of an inner race 36 and an outer race 38. Disposed on the outer surface of the inner race and the inner surface of the outer race are a plurality of bearing elements 39. The inner race includes a key way 36a for use in coupling the inner race to a drive shaft by means of, for example, a spline or similar mechanism, in order to prevent relative movement of the race and the shaft. The outer race includes a notch 38a for cooperating with either a bearing carrier or the housing 18 to prevent relative rotation of the outer race to the bearing carrying element.

Figure 7A:
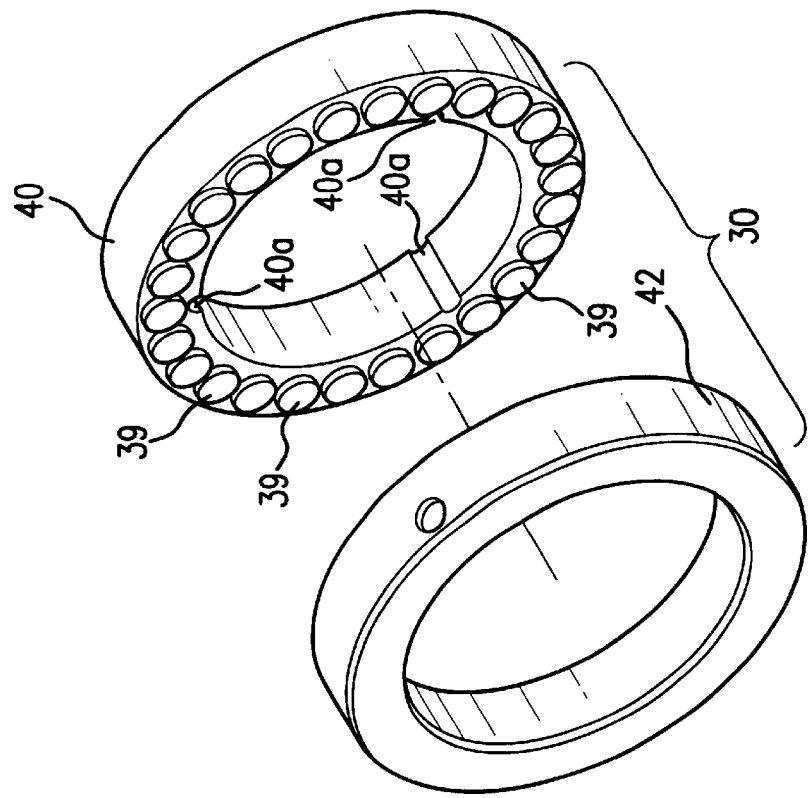
FIG. 7 is an exploded view of a PDC thrust bearing assembly for a drilling tool.
Figure 7B:
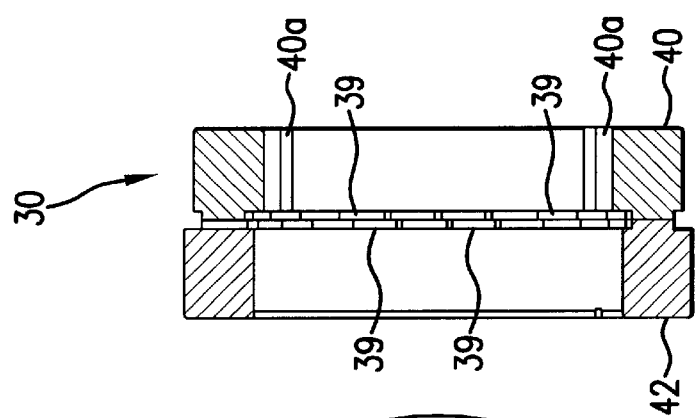
Figure 7C:
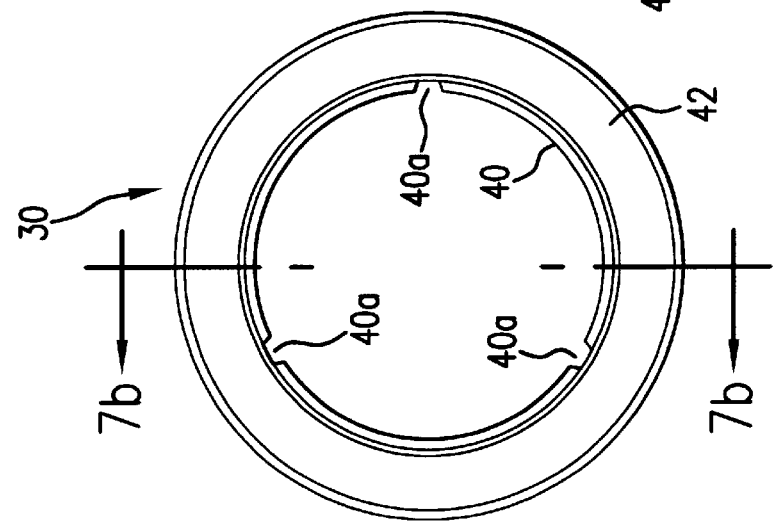
Figure 8:
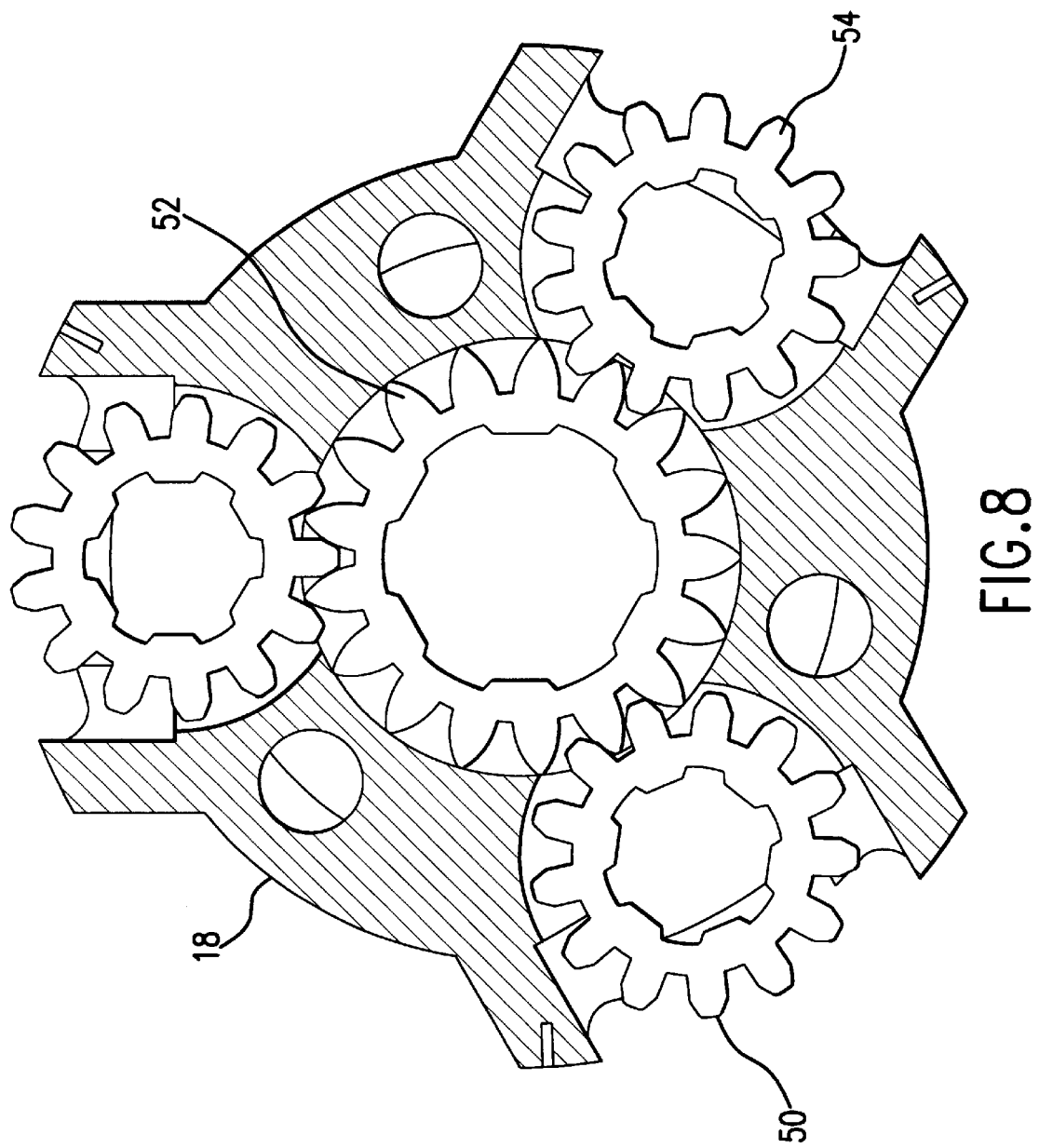
FIG. 8 is a cross sectional view of a gear assembly for a drilling tool.

Referring now to FIGS. 7a, 7b and 7c, each thrust bearing 30 is comprised of a rotor 40 and a stator 42. The rotor rotates with the spinning element, such as drive shafts 20 and 22 in the illustrated tool 10. The rotor is rotationally fixed to the spinning element by, for example, splines that cooperate with key ways 40a. The stator is fixed to a carrying element, such as bearing carrier 29 or 31, or housing 18. Disposed on each of the opposing faces of the stator and the rotor are a plurality of bearing elements 39.

The bearing elements 39, at least their load and wear surfaces, are comprised of an abrasion-resistant, low friction material. In the exemplary embodiment, a diamond material, such as PDC, is used on at least the load and wear surfaces. The diamond material may contain other materials, and may be supported on other types of materials, such as tungsten carbide. If a conventional PDC element is used, the element may be attached to the bearing structure, i.e. the race, rotor or stator, by pressing or brazing it to the structure. A PDC element tolerates higher static loads and speeds due the relative strength and low friction of the PDC, and is thus preferred. A bearing using such elements does not require a sealed compartment for containing a lubricant such as grease. Drilling mud can be used as lubricant. Thus, use of PDC bearings permits simpler construction and maintenance of the tool 10. However, the bearing elements used in the radial bearings must have curved surfaces that approximate the curvature of the races to which they are mounted.

During operation, drilling tool 10 is connected to a drill string. Drive connection 24, which in turn rotates the main drive shaft, is connected to a motor, such as a turbine. In the exemplary embodiment, the shaft of the turbine is mated with main shaft 20 using a spline. Such a connection allows for length mismatches between the inner and outer components. Housing 18 is formed with an API or similar connection for connection to the outer housing of the turbine. The turbine is then connected to the drill string. Drilling fluid is pumped down the drill string through the vanes of the turbine to generate a rotational output that turns the main drive shaft. A top drive unit at the surface also rotates the entire drill string to turn the drilling tool and thereby form a completely round hole.

Referring again to FIG. 1, when using a turbine, the drilling fluid exiting the turbine flows through the center of the main drive shaft 20. The main drive shaft includes an opening through which a portion of the drilling flows into the housing. Once in the housing, channels (not visible) direct the fluid to nozzles 26 that provide fluid to the cutting faces of the mills for cooling and cleaning. The fluid also is directed toward the bearings supporting the main drive shaft 20 and secondary drive shafts 22. Fluid continuing down shaft 20 passes through nozzles 28 and thereby supplies fluid to the cutting face of pilot bit 14.

What is claimed as the invention is:

1. A drilling tool comprising:
   a central bit comprising a plurality of diamond or other abrasion resistant cutting elements and having a central bit axis of rotation aligned with a center axis of said drilling tool;
   one or more outer mills disposed peripherally around the central bit, each of the outer mills comprising a plurality of abrasion resistant cutting elements;
   a transmission for rotating the central bit in a first direction and the one or more outer mills in a second direction;
   said central bit mounted on a main shaft extending forward of a plane in which the one or more outer mills revolve, whereby said central bit is disposed forward of said plane in which said one or more outer mills revolve; and
   each of said one or more outer mills having a mill axis of rotation substantially parallel to said center axis of said drilling tool, said mill axis of rotation disposed at a distance from said center axis, said distance being less than a sum of the radii of the respective one or more outer mills and the central bit.

2. The drilling tool of claim 1, wherein the transmission comprises the main shaft and one or more secondary shafts, to which respective ones of the one or more outer mills are coupled.

3. The drilling tool of claim 2 wherein the main shaft transmits power to each secondary shaft through a gearing having wear surfaces hardened by diamond or other wear resistant material.

4. The drilling tool of claim 2 wherein at least one of the main shaft and one or more of the secondary shafts is supported within a bearing housing with bearing elements having diamond or other hardened wear surfaces.

5. The drilling tool of claim 4 wherein the bearing housing comprises a radial bearing and a thrust bearing.

6. The drilling tool of claim 4 further including a housing having pathways for flowing drilling fluid to the bearing for cooling and lubrication.

7. A drilling tool comprising:
   a central bit comprising a plurality of cutting elements;
   one or more mills disposed around the central bit;
   a transmission for rotating the central bit in a first direction and each of the one or mills in a second direction;
   the central bit mounted on a main shaft that extends forward of a plane in which the one or more mills revolve and having a central bit axis of rotation aligned with a center axis of the drilling tool; and
   each of the one or more mills having a mill axis of rotation substantially parallel to said center axis and located at a distance from the center axis of the drilling tool, said distance being less than a sum of the radii of the respective one or more mills and the central bit.

8. The drilling tool of claim 7, wherein the transmission comprises the main shaft and one or more secondary shafts to which respective ones of the one or more mills is coupled.

9. The drilling tool of claim 8 wherein at least one of the main shaft and one or more of the secondary shafts is supported within a housing by radial and thrust bearings having bearing elements with diamond wear surfaces.

10. A method for drilling comprising:
    lowering a drilling tool on an end of a drill string, the drilling tool comprising a central bit comprising a plurality of diamond cutting elements and having a central bit axis of rotation aligned with a center axis of the drilling tool; one or more mills disposed peripherally around the central bit, each of the mills comprising one or more diamond cutting elements and having a mill axis of rotation substantially parallel to said center axis, said mill axis of rotation disposed at a distance from said center axis, said distance being less than a sum of the radii of the respective one or more mills and the central bit, and said central bit mounted on a shaft that extends forward of a plane in which said one or more mills revolve; and a transmission for rotating the central bit in a first direction and each of the one or more mills in a second direction;
    rotating the drill string; and
    providing rotational power to the transmission.

11. The method of claim 10 wherein providing rotational power to the transmission includes pumping drilling fluid through the drill string to a turbine or motor that is coupled to an input of the transmission.

12. The method of claim 11 further comprising flowing the drilling fluid into the drilling tool for cooling of bearings supporting rotating components of the transmission.

13. The method of claim 12 wherein the bearings include diamond wear surfaces, or other wear resistant surfaces.

14. The method of claims 10 further comprising drilling a pilot hole with the central bit in advance of milling a wider bore with the one or more mills.

* * * * *